US012043516B2

(12) United States Patent
Kuhn et al.

(10) Patent No.: US 12,043,516 B2
(45) Date of Patent: Jul. 23, 2024

(54) SYSTEM AND METHOD FOR REMOTELY PROVIDING VIDEO AND AUDIO INFORMATION OF ELEVATOR MOVEMENT

(71) Applicant: Lift AI, LLC, Toledo, OH (US)

(72) Inventors: Jerrod Kuhn, Ottawa Hills, OH (US); Robert J. Wurth, San Francisco, CA (US); Bruce Giese, Cedar Park, TX (US)

(73) Assignee: LIFT AI, LLC, Toledo, OH (US)

( * ) Notice: Subject to any disclaimer, the term of this patent is extended or adjusted under 35 U.S.C. 154(b) by 981 days.

(21) Appl. No.: 17/022,731

(22) Filed: Sep. 16, 2020

(65) Prior Publication Data

US 2021/0078825 A1   Mar. 18, 2021

Related U.S. Application Data

(60) Provisional application No. 62/901,908, filed on Sep. 18, 2019.

(51) Int. Cl.
| | |
|---|---|
| *B66B 1/34* | (2006.01) |
| *B66B 5/00* | (2006.01) |
| *G10L 25/51* | (2013.01) |
| *H04N 5/76* | (2006.01) |
| *H04N 7/18* | (2006.01) |
| *H04Q 9/00* | (2006.01) |
| *H04R 1/08* | (2006.01) |

(52) U.S. Cl.
CPC .......... *B66B 1/3461* (2013.01); *B66B 1/3492* (2013.01); *B66B 5/0018* (2013.01); *B66B 5/0025* (2013.01); *G10L 25/51* (2013.01); *H04N 5/76* (2013.01); *H04N 7/183* (2013.01); *H04Q 9/00* (2013.01); *H04R 1/08* (2013.01); *H04Q 2209/30* (2013.01); *H04Q 2209/43* (2013.01); *H04Q 2209/82* (2013.01)

(58) Field of Classification Search
CPC ... B66B 1/3461; B66B 1/3492; B66B 5/0018; B66B 5/0025; G10L 25/51; G10L 25/48; H04N 5/76; H04N 7/183; H04N 5/77; H04Q 9/00; H04Q 2209/30; H04Q 2209/43; H04Q 2209/82; H04Q 2209/823; H04R 1/08
See application file for complete search history.

(56) References Cited

U.S. PATENT DOCUMENTS

2019/0270611 A1* 9/2019 Mahoney .............. B66B 1/3461

\* cited by examiner

*Primary Examiner* — Xiao En Mo

(74) *Attorney, Agent, or Firm* — Shumaker, Loop & Kendrick, LLP

(57) ABSTRACT

A system for providing audio, video and movement data of an elevator to a remote application. The system includes a camera positioned in the elevator that provides video images of the elevator, an audio device that provides audio data of the operation of the elevator, and one or more sensors that provide data showing movement of the elevator. The system also includes a controller that is responsive to and processes the video images, the audio data and the elevator movement data. A communications device transmits the processed video images, the audio data and the elevator movement data to the remote application to allow a user of the application to watch a video of a trip of the elevator, listen to the audio of operation of the elevator during the trip, feel the vibration of the elevator during the trip, and see the speed, acceleration and direction of the elevator.

23 Claims, 3 Drawing Sheets

SYSTEM AND METHOD FOR REMOTELY PROVIDING VIDEO AND AUDIO INFORMATION OF ELEVATOR MOVEMENT

CROSS-REFERENCE TO RELATED APPLICATIONS

This application claims the benefit of the priority date of U.S. Provisional Patent Application Ser. No. 62/901,908, titled SYSTEM AND METHOD FOR REMOTELY PROVIDING VIDEO AND AUDIO INFORMATION OF ELEVATOR MOVEMENT, filed Sep. 18, 2019.

BACKGROUND

Field

This disclosure relates generally to a system and method for providing audio, video and movement data of an elevator to a remote application and, more particularly, to a system and method for providing audio, video and movement data of an elevator to a remote application to allow a user of the application to watch a video of a trip of the elevator, listen to the audio of operation of the elevator during the trip, feel the vibration of the elevator during the trip, and see the speed, acceleration and direction of the elevator.

Discussion of the Related Art

Elevators are typically a crucial part of a building, especially a high rise building, in that they must operate to reliably and quickly move persons from floor to floor. If an elevator stops operating or has other performance issues it must be reported as soon as possible so that maintenance personnel can service the elevator and reduce user inconvenience. Typically, a non-operating elevator is reported to a building manager, who usually is not on-site, by a user of the elevator, where the building manager then contacts the maintenance personnel. Thus, there may be a significant lag time from when the elevator stops operating or is not operating properly to when the elevator is fixed. Also, there could be false reporting of a non-operating elevator, for example, if a user holds the elevator door open for an extended period of time, and the elevator is reported as non-operating by someone else. In that situation, the maintenance personnel could be called, but the elevator is actually working when the maintenance worker arrives to service it. This is referred to in the industry as running on arrival (ROA).

A single building or group of buildings may have a wide variety of different types of elevators with different elevator controllers and different equipment. Connecting into the control systems of many different types of elevators is very time consuming and difficult for the wide range of elevators that exist. For this reason, there is a significant need for monitoring elevator equipment which requires no connections into the elevator system. However, for random traffic use patterns, it can be difficult for a non-intrusive elevator monitoring device to determine if the elevator is truly stopped or is not supporting the intended rate of elevator trips. Thus, it would be desirable to provide a system which addresses the concerns described above.

SUMMARY

The following discussion discloses and describes a system and method for providing audio, video and movement data of an elevator to a remote application. The system includes an optical device, such as a camera, positioned in the elevator and providing video images of the elevator, an audio device providing audio data of the operation of the elevator, and one or more sensors providing data showing movement of the elevator. The system also includes a controller that is responsive to and processes the video images, the audio data and the elevator movement data. A communications device transmits the processed video images, the audio data and the elevator movement data to the remote application to allow a user of the application to watch a video of a trip of the elevator, listen to the audio of operation of the elevator during the trip, feel the vibration of the elevator during the trip, and see the speed, acceleration and direction of the elevator.

Additional features of the disclosure will become apparent from the following description and appended claims, taken in conjunction with the accompanying drawings.

DETAILED DESCRIPTION OF THE EMBODIMENTS

Figure 1:
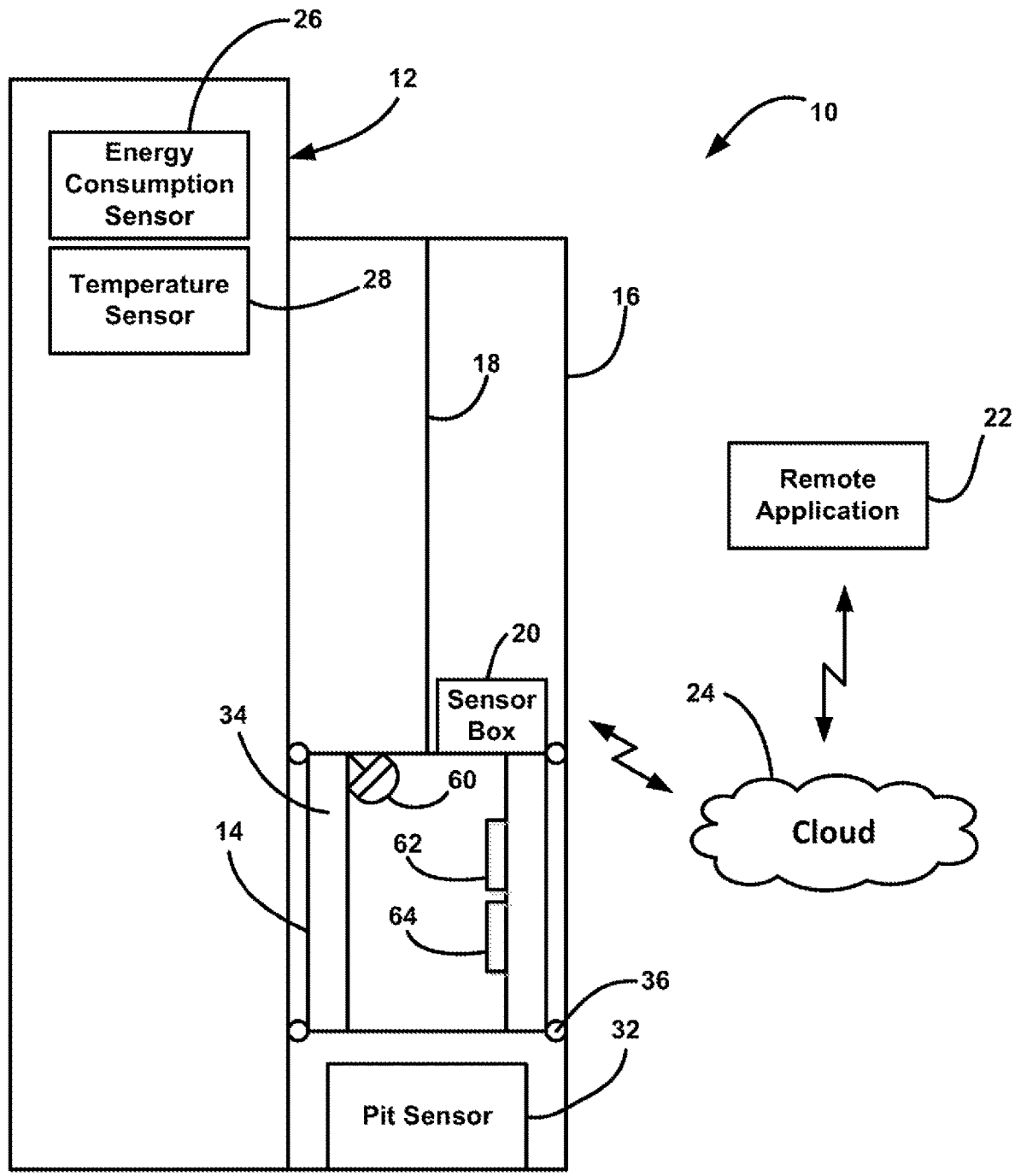
FIG. 1 is a block diagram of an elevator system including a camera for obtaining images in the elevator, sensors for obtaining elevator movement data and audio information and a sensor box for processing images, the audio information and the elevator movement data and sending the processed information to a remote application.

The following discussion of the embodiments of the disclosure directed to a system and method for providing audio, video and movement data of an elevator to a remote application is merely exemplary in nature, and is in no way intended to limit the invention or its applications or uses.

As will be discussed in detail below, this disclosure describes an elevator system that includes a number of sensors, processors, cameras and communications devices that monitor the operation of an elevator or bank of elevators and send notifications of actionable data to an owner, operator or user of the elevator at a remote location using, for example, a mobile application to allow the user to make informed decisions about the elevator. The system sends elevator shut-down warnings that notify the user that there is a certain degree of likelihood that an elevator is shutdown, where the warning explains why the elevator shutdown warning is being sent. The system allows the user to activate a running on arrival (ROA) watch via the remote application, where the user activates the ROA watch for a particular elevator by operating a button on the remote application. The remote application provides three types of information about the elevator, namely, the status as of activation, i.e., the last time the elevator ran, the number of floors the elevator moved to and the current location of the elevator in the hoistway; a historical event log, for example, number of rides, unexpected acceleration/deceleration of the elevator, an unexpected stopping location of the elevator, unexpected sounds, etc.; and a streaming event log, where the system provides streaming updates via text, or a similar manner, of all events subsequent to the ROA watch being activated by user.

The system can send user notifications that passengers are trapped in the elevator and send user notifications via the remote application that maintenance is required before the elevator breaks down (predictive maintenance), such as elevator or landing door performance is degrading and the elevator doors need to be serviced, elevator roller guides need to be serviced or replaced, ride quality is worsening and needs to be addressed, moisture is detected in the pit and the temperature in the machine room or hoistway is outside of specification. The system generates regular (e.g. monthly) elevator usage reports for resource optimization, where traffic analysis indicates how often the elevator is running, how often the elevator is broken down, what floors the elevator visits, how many trips the elevator takes, and the time of day the elevator is being used. The system also determines elevator usage per bank, specifically, whether the usage of the elevators within a bank of multiple elevators is distributed to share the load appropriately and the power consumption in the elevator machine room.

Elevators within a bank should have a consistent allocation of the overall number of trips for that bank, which can be monitored and provide an indication of a shut-down. The system determines that the elevator doors have opened or closed without elevator movement. Sounds in the elevator hoistway can be captured and an audio fingerprinting algorithm can be used to identify the sound of the elevator doors opening and closing. More specifically, elevator doors open and close before and after elevator movement such that if the elevator doors open and close repeatedly without the elevator moving, an indication of a shut-down can be given. The system uses sensor data to identify the locations within the hoistway where the elevator comes to rest, and those locations are logged. Since an elevator should consistently come to rest at the same location within the hoistway, an elevator at rest between logged locations indicates an elevator shut-down, and a shutdown warning can be initiated.

An ROA watch can be activated when a user presses a button on the remote application that increases the frequency of regular reports being sent for a particular elevator. An elevator's status as of activation is provided by sending the last time the elevator ran via the trip log, the number of floors the elevator moved to, and the current location of the elevator in the hoistway. A historical event log can be provided by sending the last ten events that occurred for the elevator, where an event includes a trip that is pulled from the trip log. An unexpected acceleration or deceleration of the elevator that is outside of an acceptable range of previous accelerations and decelerations for that elevator is an indication of the elevator stopping at a location other than one of the normal resting places for the elevator, or a sound that is deemed inconsistent with the normal audio fingerprint of the elevator. The system also can include a streaming event log, where for a predetermined period of time (e.g. 10 minutes), the user receives real-time text messages of any events associated with the elevator.

Audio fingerprinting can be employed where the system collects audio signals during the time immediately before and immediately after a usage trip and applies audio signal processing to create a distinct signature for the audio in order to find common repeating patterns corresponding to the sound of the doors opening and closing occurring frequently (but not always) in the time periods. A common signature occurs within the time before the beginning of a large portion of elevator trips, which corresponds to the doors opening. Similarly, a common signature occurs within the time after the end of a large portion of the elevator trips, which corresponds to the doors closing. Based on these patterns, the system is able to detect at any time when the elevator doors open and close with a high degree of accuracy.

FIG. 1 is a block diagram of an elevator system 10 that provides the various features discussed above and is part of, for example, a building 12, such as an office building, apartment building, etc. The elevator system 10 includes an elevator 14 (sometimes known as an elevator car) traveling in a hoistway 16 on roller guides 36 by operation of a cable 18 between building floors in the usual manner, and could be part of a bank of elevators, where the elevator 14 includes elevator doors 34. The elevator 14 may use other types of guides, other means of vertical actuation, etc., as known in the art. A sensor box 20 is mounted to the elevator 14 generally by being screwed or taped to a top panel of the elevator 14 and, as will be discussed in detail below, provides data, information, measurements, etc. to a remote application 22 through a network cloud 24, where software on the cloud 24 can analyze the data before it is sent to the remote application 22. The remote application 22 can be operating on any suitable device or devices for the purposes described herein, such as a smart phone, tablet, desktop computer, and/or another device that can run a certain application and alert or provide status of elevator operation to a certain entity, such as a property owner, property manager, elevator service company, or another supervising party or machine. The data sent to the remote application 22 can be in any suitable form and displayed on the application 22 in any suitable format, such as text or images.

An IP or web camera 60 is installed inside of the elevator 14 and is positioned to be focused on the elevator doors 34, an elevator operating panel 62 showing floor buttons and a position indicator 64 that indicates what floor the elevator 14 is on and if it is going up or down. The camera 60 provides images and/or video to be sent to the sensor box 20 by any suitable method, such as wireless, wired, network connection, Bluetooth, etc. An energy consumption sensor 26 provides elevator energy consumption information to the sensor box 20, a temperature sensor 28 measures the ambient temperature around the elevator 14 and a pit sensor 32 is positioned at the bottom of the hoistway 16 to provide moisture detection signals. The sensors 26, 28 and 30 also provide signals to the sensor box 20 by any suitable means including wired or wireless transmission—preferably a wireless communication channel such as Bluetooth or WiFi.

The sensor box 20 is not connected with and does not communicate with the elevator control system which controls the actual operation of the elevator 14. By virtue of being completely separate and independent from the elevator control system, the sensor box 20 is easily installable for use with a wide variety of elevator systems—including elevator systems from different manufacturers, of different models and vintages, etc. Furthermore, installation of the sensor box 20 does not require knowledge of any technical aspect of the elevator control system—including wiring schematics, data formats, communication protocols, etc.

Figure 2:
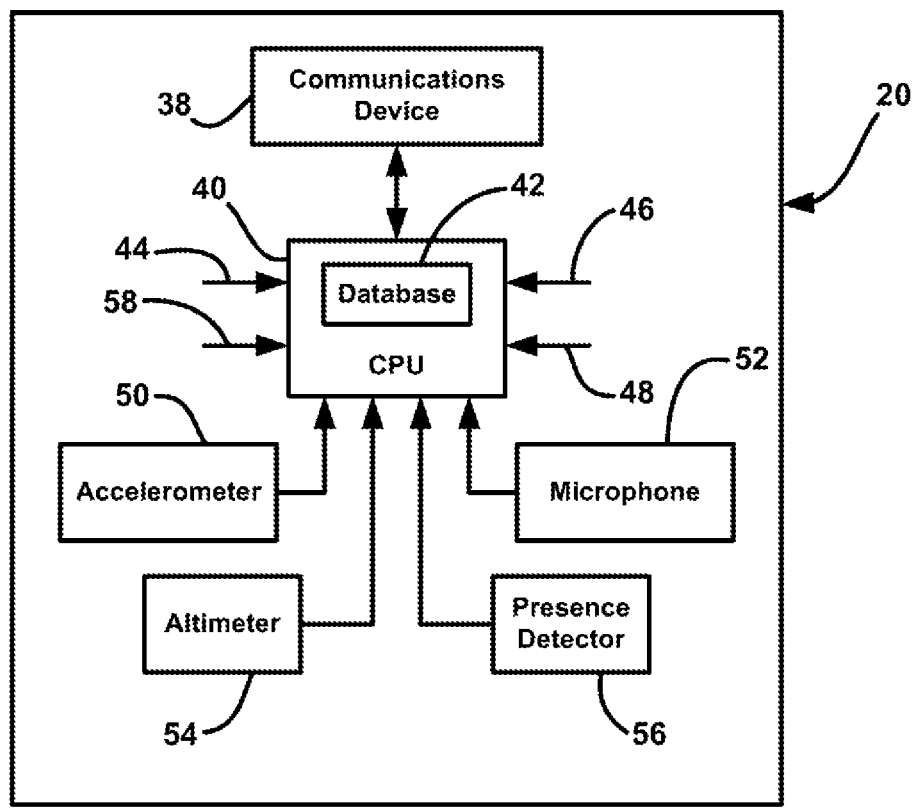
FIG. 2 is a block diagram of the sensor box separated from the elevator system.

FIG. 2 is a block diagram of the sensor box 20 separated from the system 10 that includes a central processing unit (CPU) 40 having a database 42 and that operates many of the algorithms and processes discussed herein. The sensor box 20 includes a communications device 38 that allows the sensor box 20 to communicate with the cloud 24, and may include one or more of a cellular modem, an Ethernet connection, Bluetooth capability, a wireless LAN (WiFi) adapter, etc. The CPU 40 receives the energy consumption signals from the energy consumption sensor 26 on line 44, the temperature measurement signals from the temperature sensor 28 on line 46, the moisture signals from the pit sensor 32 on line 48 and the images from the camera 60 on line 58. If any of these signals or images provides data that is outside of a normal predetermined range, the CPU 40 can send a warning signal to the remote application 22 (via the cloud 24) for service.

The sensor box 20 also includes an accelerometer 50 that detects movement of the elevator 14 and sends elevator movement data to the CPU 40. The CPU 40 can use this data in connection with a historical look-back feature to determine the probability that the elevator 14 is shut-down. For this feature, an algorithm operating in the CPU 40 uses the movement data to determine that a trip has occurred each time the elevator 14 starts and stops moving, and logs the trips for the elevator 14 in the database 42 with a timestamp. The algorithm creates a historical log of the number of the trips during a given time period (e.g. one hour) on a given day of the week (e.g. Saturday) and compares the number of trips for the elevator 14 in the "current" time period to the expected number of trips on the same day of the week and time from the historical log. For example, the algorithm may determine that there were zero trips today, Tuesday, between 8 am and 10 am, and at least fifty trips on each of the last ten Tuesdays between 8 am and 10 am. If the number of the trips during the current time period is significantly different, i.e., outside of a predetermined percentage, than the previous same time period an elevator shut-down has likely occurred, and a shut-down warning is sent to the remote application 22. The user sees the notification on the remote application 22 and ensures the elevator 14 receives service.

The sensor box 20 also includes a microphone 52 that detects sounds in and around the elevator 14, and those sounds can be used to determine whether the elevator doors 34 are opening and closing without the elevator 14 moving. More particularly, the microphone 52 captures sounds in the elevator hoistway 16 and sends audio files of the sounds to the CPU 40, where an algorithm operating in the CPU 40 converts the audio files into audio fingerprints that connect a certain sound to a certain thing (event). Since the elevator doors 34 make a consistent sound when they open and close, the algorithm can categorize which of the audio fingerprints are the elevator doors 34 opening and closing. By using data from the accelerometer 50 indicating elevator movement over time, the algorithm can determine if the elevator doors 34 are being repeatedly opened and closed without the elevator 14 moving during the same time period, which is an indication of a shut-down. A shut-down warning can be sent to the remote application 22.

The system 10 can also use the audio fingerprints generated from the audio files from the microphone 52 of the doors 34 opening and closing to determine elevator door opening performance. Specifically, since the CPU 40 can categorize the audio fingerprints of the elevator doors 34 opening and closing, currently collected audio fingerprints of the elevator doors 34 opening and closing can be compared to previously collected audio fingerprints of the elevator doors 34 opening and closing, where a significant enough difference therebetween may be an indication that the elevator doors 34 are degrading or not operating properly.

The sensor box 20 also includes a pressure sensor or altimeter 54 that detects the pressure of the air surrounding the elevator 14 at a given point in time and sends the air pressure data to the CPU 40. An algorithm operating in the CPU 40 calculates the altitude of the elevator 14 based on the air pressure to identify the location of the elevator 14, and thus the CPU 40 can generate a log of the locations where the elevator 14 regularly stops. Since the elevator should only stop at the elevator landings within the building 12, if the elevator 14 stops at an altitude that is not at an elevator landing, this is an indication that the elevator 34 is not operating properly. The algorithm compares the location where the elevator 14 has stopped to the locations where the elevator 14 should stop, and if those locations do not match, the algorithm assigns a likelihood that the elevator 14 is not operating properly and should be shut-down, which is transmitted to the remote application 22.

The location of the elevator 14 in the hoistway 16 can also be determined by using the data from the accelerometer 50. As discussed, the accelerometer 50 detects movement of the elevator 14 over time and sends the elevator movement data to the CPU 40. An algorithm operating in the CPU 40 uses the movement data to determine the speed at which the elevator 14 has moved and the time it took to move (that is, double integrating the acceleration signal to obtain position) to determine at what location in the elevator hoistway 16 the elevator 14 is stopped. The algorithm logs the locations in the elevator hoistway 16 where the elevator 14 stops regularly, where the elevator 14 should only stop at elevator landings within the building 12. If the elevator 14 stops at another location, it is an indication of a shut-down. The algorithm compares the location where the elevator 14 has stopped to the locations where the elevator 14 should stop, and if those locations do not match, the algorithm assigns a likelihood that the elevator 14 is not operating properly and should be shut-down, which is transmitted to the remote application 22. Both of these elevator location techniques can be combined to more accurately determine whether an elevator shut-down event is occurring.

The sensor box 20 also includes a presence sensor 56, such as an optical sensor, a camera, a thermal detector, etc., that sends signals to the CPU 40 that can be used to detect the presence of a person or persons in the elevator 14. An algorithm operating in the CPU 40 uses the data to determine the likelihood that a person is entrapped in the elevator 14 when a shut-down warning is given for any of the shut-down detection techniques discussed herein. If the algorithm indicates that it is likely that a person is in the elevator 14 at the same time that a shut-down warning has been generated, the CPU 40 also sends an entrapment warning to the remote application 22.

The system 10 also includes a live event log feature. A user can press a button on the remote application 22 so that it sends a message to the CPU 40 to increase the type and frequency of the notifications and reports sent to the remote application 22 concerning elevator activity. Those notifications and reports can include when the elevator 14 moves using the accelerometer data, where the elevator moved from and to using the accelerometer and altimeter data, elevator door opening and closing information using the microphone data, the elevator's current position using an algorithm processing the altimeter and/or accelerometer data, etc. All of the information can be provided in real-time about the elevator's subsequent activity for a time period determined by the user.

The system 10 can also use the sounds in the elevator hoistway 16 captured by the microphone 52 to determine elevator ride quality as provided by the elevator roller guides 36. The microphone 52 sends the audio files of the sounds captured in the elevator hoistway 16 to the CPU 40, and an algorithm operating in the CPU 40 converts the audio files into audio fingerprints. Since the elevator roller guides 36 make a consistent sound at a given location in the elevator hoistway 16, the CPU 40 can categorize certain ones of the audio fingerprints as the sound of the elevator roller guides

36. The accelerometer 50 determines the elevator's movement over time and sends the elevator movement data to the CPU 40. The algorithm uses the audio fingerprints of the elevator roller guides 36 during a normal operation and the location of the elevator 14 in the elevator hoistway 16 to determine the audio fingerprint of the elevator roller guides 36 at certain locations in the elevator hoistway 16. The algorithm compares the audio fingerprints of the sounds that occur at certain locations in the elevator hoistway 16 to the audio fingerprints of the elevator roller guides 36 in normal operation at certain locations in the elevator hoistway 16. If the audio fingerprints are inconsistent and outside of some predetermined percentage, the CPU 40 determines the likelihood of a roller guide ride quality issue, and notifies the remote application 22 accordingly. In an alternate embodiment, audio pattern recognition, i.e., vertical and horizontal line recognition in a spectrogram, can be used instead of audio fingerprints.

Ride quality can also be determined based on vibration. In this embodiment, the accelerometer 50 detects vibrational movement on the elevator 14 and sends vibrational data to the CPU 40. An algorithm operating in the CPU 40 determines the normal amount of vibrational movement on the elevator 14 and compares the detected vibrational movement data to the normal vibrational data, such that if the vibrational movement exceeds the normal amount by a certain percent, or the vibrational movement has different frequency characteristics than normal, the CPU 40 sends a ride quality warning to the remote application 22.

This system 10 can also be configured to provide a video and audio clip or file of an elevator trip in combination with elevator movement data in the form of, for example, vibration data from the accelerometer 50, up or down direction data and acceleration data from, for example, the accelerometer 50 that is delivered to the mobile application 22. The video taken by the camera 60 is processed on the camera 60 and then stored and processed in the CPU 40. An algorithm operating in the CPU 40 recognizes when the elevator 14 has taken a trip through data obtained by the accelerometer 50 and stores the video that corresponds with the timing of the trip. The audio data taken by the microphone 52 is stored in the database 42 and processed in the CPU 40. The algorithm operating in the CPU 40 recognizes when the elevator 14 has taken a trip through the accelerometer data and keeps the audio data that corresponds with the timing of the elevator trip. The accelerometer data is processed through the algorithm and is converted into vibration data, a determination of the elevator's acceleration and/or speed, and whether the elevator moved up or down. The accelerometer data that corresponds to the trip's audio and video is captured and stored in the database 42.

The audio, video and elevator movement data is stored in the database 42 and/or in the cloud 24. The user of the remote application 22 requests the audio, video and car movement data for a specific elevator from a button in the remote application 22 or similar mechanism. The audio, video and elevator movement data is sent from the sensor box 20 or the cloud 24, through the cloud 24, to the remote application 22 via WiFi, cellular, or other connection to the user of the remote application 22. The user of the remote application 22 can watch a video of the elevator trip, listen to the audio of the elevator trip, feel the vibration of the elevator 14 with the haptics on the mobile device, see the relative speed/acceleration and direction of the elevator 14 through animation in the remote application 22, and read movement data such as elevator speed or acceleration. The user of the remote application 22 can then take necessary action depending on the information obtained from the audio, video and elevator movement data. That is—after watching, listening to, and feeling one or more actual elevator trips using the remote application 22—the user will be able to determine based on his or her own experience whether the elevator 14 is operating normally or if service is required.

Figure 3:
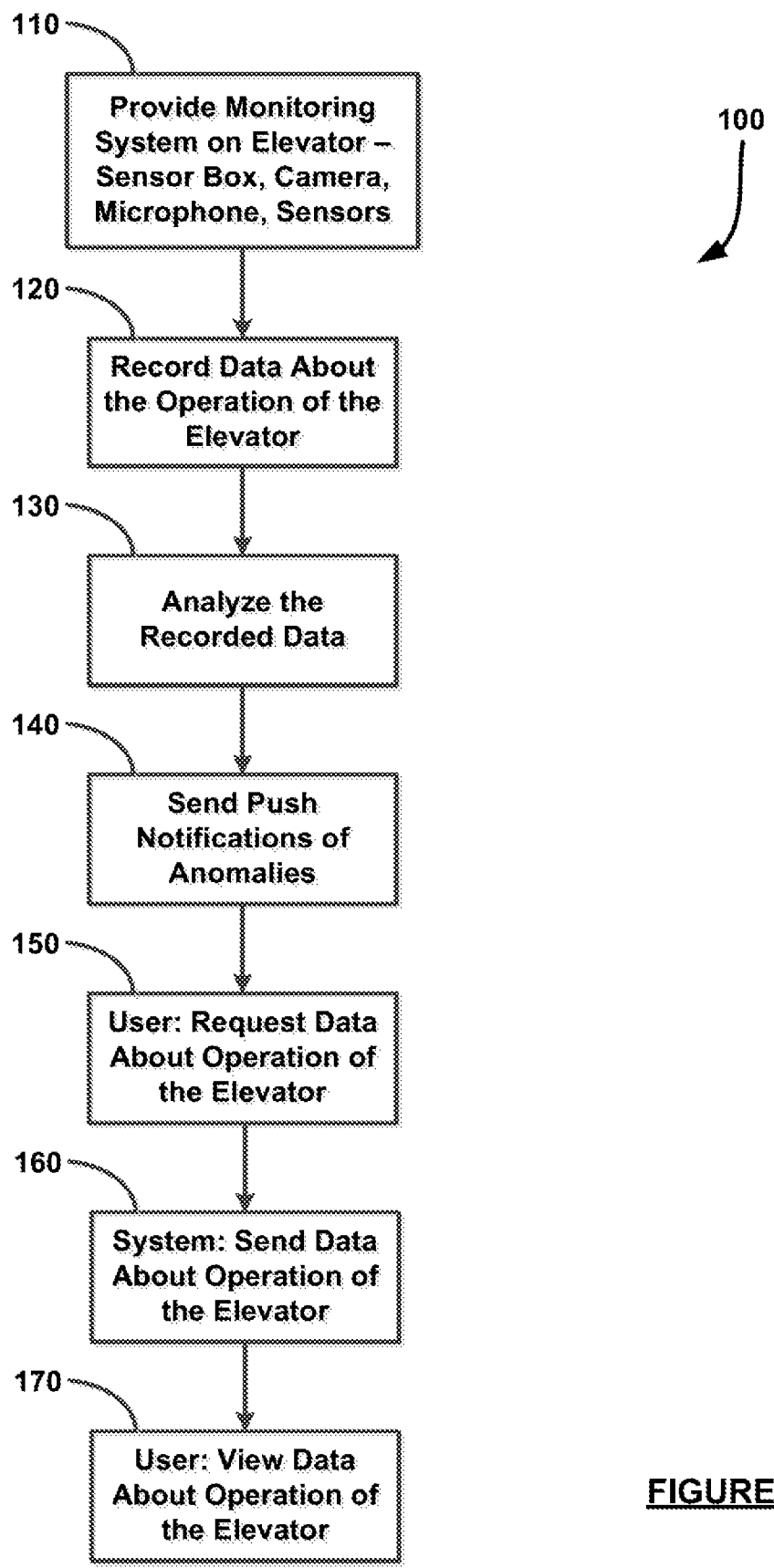
FIG. 3 is a flowchart diagram of a method for remotely monitoring movement of an elevator.

FIG. 3 is a flowchart diagram 100 of a method for remotely monitoring movement of an elevator. At box 110, a monitoring system is provided for an elevator installed in a building. The monitoring system includes a sensor box or controller mounted to the elevator car, an optical device (vision sensor or camera) capturing images of the interior of the elevator car, an audio device or microphone capturing sound data from the elevator car, and one or more sensors capturing information about movement of the car—including vibration/acceleration data and altitude/height data. The monitoring system may also include remote sensors measuring energy consumption of the elevator, temperature in the elevator shaft and moisture in a pit of the elevator shaft. The sensor box includes a processor and memory, with a database for storing data about the elevator including individual elevator trips.

The sensor box of the monitoring system also includes a communication device capable of two-way wireless communication to/from the Internet (an Internet-based or cloud-based server and/or communications router), which in turn provides communication to/from devices running a remote application. The remote application, which is part of the monitoring system, enables a user to view and consume data about the elevator and elevator trips, request specific data, change configuration settings, and receive alerts or push notifications.

The monitoring system is not connected to the operational control system of the elevator. Rather, the monitoring system operates independently of the elevator control system, which greatly simplifies installation on any make/model, type and age of elevator. Multiple instances of the monitoring system may be installed, one for each elevator car in a building, where the building may include one or more banks of elevator cars operating cooperatively. Each instance of the monitoring system includes the sensor box and the multiple sensors (camera, microphone, vibration sensor, etc.) specific to each individual elevator car, and the user may view data from all of the multiple instances on his or her remote application.

At box 120, data about the operation of the elevator is recorded by the sensor box. The data about the operation of the elevator includes camera images of the elevator car interior, audio data, acceleration data and altitude data about the elevator car, elevator energy consumption data, elevator shaft temperature data and elevator pit moisture data. The data about the operation of the elevator is stored in the database in the memory of the sensor box.

At box 130, the recorded data is analyzed by the processor in the sensor box. Analyzing the recorded data includes organizing the data into individual elevator trips based on time stamp information, where each elevator trip includes the camera images, audio data and all other sensor data for a particular excursion of the elevator car—all of which are time-synchronized for playback by the user on the remote application. Analyzing the recorded data also includes identifying anomalies in the data, where the anomalies may include the elevator car stopping at a location other than a doorway in the elevator shaft, the elevator car not moving for an extended period of time, repeated door openings and closings, doors stuck open or closed, abnormal sounds detected from the elevator car, abnormal vibrations of the elevator car, or power consumption, elevator shaft temperature or elevator pit moisture readings out of specification.

At box 140, push notifications describing any anomalies are sent to the cloud by the sensor box, and are relayed by the cloud to any user's remote application which is subscribing to or linked to the particular elevator for which the anomaly was identified. The push notifications (or alerts) are immediately displayed by the remote application, and identify the elevator and the nature of the anomaly. The push notifications also specifically identify passenger entrapment in a shut-down elevator when such an event is detected.

At box 150, the user of the remote application requests data about the operation of the elevator. The request could be based on a push notification received from the monitoring system, or based on a phone call from a building tenant, or for any other reason. The request may include activating a running on arrival (ROA) watch for a particular elevator.

At box 160, data about the operation of the elevator are sent from the sensor box to the user's remote application (via the cloud) based on the user request. The data provided by the sensor box includes elevator status (last time the elevator moved, current floor location of elevator, etc.), a historical event log (trip history, listing of unexpected accelerations/vibrations, sounds, or stopping locations for each trip, etc.), and a streaming event log (similar data to the historical event log, except provided in real time as they happen). The data about the operation of the elevator may also include a playback of one or more individual elevator trips. The elevator trip playback includes time-synchronized playback of camera image data, audio data and all sensor data. This allows the user to watch the video of the elevator trip, listen to the audio of the elevator trip, feel the vibration of the elevator car during the trip, and see displays of sensor data (elevator car speed and direction, floor location, acceleration, etc.).

At box 170, data about the operation of the elevator are viewed by the user on the remote application. Viewing the data includes viewing any or all of historical event logs, streaming event logs, and elevator trip playback of audio, video and sensor data. After viewing the data, and also based on the push notifications, the user can take any appropriate action regarding the elevator—including calling for emergency egress assistance, ordering an immediate shut-down of the elevator, scheduling preventive maintenance on the elevator, etc.

The elevator monitoring system and method disclosed above provide many features which provide powerful remote monitoring capability to a facility manager or other person responsible for elevator operations. These features give the user of the remote application the ability to gain insight into what is actually happening with a particular elevator car, including images, audio and sensor data. Also, by virtue of being independent of the elevator control system, the monitoring system is easily added to any type of elevator.

The foregoing discussion discloses and describes merely exemplary embodiments of the present disclosure. One skilled in the art will readily recognize from such discussion and from the accompanying drawings and claims that various changes, modifications and variations can be made therein without departing from the spirit and scope of the disclosure as defined in the following claims.

What is claimed is:

1. A system for remotely monitoring movement of an elevator, said system comprising:

an optical device positioned in the elevator and providing video images of the elevator;

an audio device positioned to provide audio data of operation of the elevator;

one or more sensors positioned to provide data showing movement of the elevator;

a controller positioned at the elevator and being responsive to and processing the video images, the audio data and the elevator movement data;

a communications device transmitting the processed video images, the audio data and the elevator movement data; and a remote application responsive to the processed video images, the audio data and the elevator movement data from the communications device, said remote application allowing a user to watch a video of a trip of the elevator, listen to the audio of operation of the elevator during the trip, feel the vibration of the elevator during the trip, and see the speed, acceleration and direction of the elevator.

2. The system according to claim 1 wherein the optical device is a camera.

3. The system according to claim 2 wherein the camera is positioned to provide images of doors of the elevator, an elevator operating panel and a position indicator in the elevator showing what floor the elevator is on.

4. The system according to claim 2 wherein the camera provides digital images and/or digital video.

5. The system according to claim 2 wherein the camera is connected to the controller by a wireless, wired, network or Bluetooth connection.

6. The system according to claim 1 wherein the audio device is a microphone.

7. The system according to claim 1 wherein the elevator movement data includes one or more of elevator vibration, elevator up and down movement and elevator acceleration.

8. The system according to claim 7 wherein the one or more sensors include an altimeter or an accelerometer.

9. The system according to claim 1 wherein the communications device includes one or more of a cellular modem, an Ethernet connection, Bluetooth capability and a wireless LAN adapter.

10. The system according to claim 1 wherein the remote application is a mobile application operating on a smart phone, a tablet and/or a desktop computer.

11. The system according to claim 1 wherein the remote application receives alerts from the communication device as prescribed by the controller, where the alerts include notification of an anomaly detected in the processed video images, audio data or elevator movement data, notification of a shut-down of the elevator, notification of passenger entrapment in a shut-down elevator, and notification of maintenance required on the elevator.

12. The system according to claim 11 wherein the anomaly in the processed audio data includes detection, through audio signal processing by the controller, of abnormal ride quality sounds from elevator roller guides, door opening or closing sounds different than a historical norm, and door opening or closing sounds at times not corresponding to a beginning or an ending of an elevator trip.

13. The system according to claim 1 wherein the remote application includes a running on arrival (ROA) watch activation button which causes the communications device and the controller to transmit elevator status data, an elevator historical event log, and an elevator streaming event log to the remote application.

14. A system for remotely monitoring movement of an elevator, said system comprising:
- an optical device positioned in the elevator and providing video images of the elevator;
- an audio device positioned to provide audio data of operation of the elevator;
- one or more sensors positioned to provide data showing movement of the elevator;
- a controller positioned at the elevator and being responsive to and processing the video images, the audio data and the elevator movement data;
- a communications device transmitting the processed video images, the audio data and the elevator movement data; and
- a remote application responsive to the processed video images, the audio data and the elevator movement data from the communications device, said remote application allowing a user to watch a video of a trip of the elevator, listen to the audio of operation of the elevator during the trip, feel the vibration of the elevator during the trip, and see the speed, acceleration and direction of the elevator,
- where the remote application includes a running on arrival (ROA) watch activation button which causes the communications device and the controller to transmit elevator status data, an elevator historical event log, and an elevator streaming event log to the remote application,
- and the remote application also receives alerts from the communication device as prescribed by the controller, where the alerts include notification of an anomaly detected in the processed video images, audio data or elevator movement data, notification of a shut-down of the elevator, notification of passenger entrapment in a shut-down elevator, and notification of maintenance required on the elevator.

15. A method for remotely monitoring movement of an elevator, said method comprising:
- recording data about operation of the elevator, by a controller having a processor and memory, where the recorded data includes video images of an interior of the elevator from an optical device, audio data from an audio device and elevator movement data from one or more sensors;
- processing the data, by the controller, including organizing the recorded data into individual elevator trips, and identifying anomalies in the recorded data;
- sending alerts which provide notification of the anomalies to a remote application via an Internet server or router, by a communications device communicating with the controller;
- sending the processed data to the remote application by the controller and the communications device; and
- viewing the processed data, by a user using the remote application, including watching a video of an elevator trip, listening to audio of the elevator during the trip, feeling vibration of the elevator during the trip, and seeing speed, acceleration and direction of the elevator during the trip.

16. The method according to claim 15 wherein the optical device is a camera which provides digital images and/or digital video, and where the camera is positioned inside the elevator to provide images of doors of the elevator, an elevator operating panel and a position indicator in the elevator showing what floor the elevator is on.

17. The method according to claim 15 wherein the one or more sensors include one or more of an altimeter on the elevator, an accelerometer on the elevator, an elevator energy consumption sensor, an elevator shaft temperature sensor and an elevator pit moisture sensor.

18. The method according to claim 15 wherein the elevator movement data includes one or more of elevator vibration, elevator up and down movement and elevator acceleration.

19. The method according to claim 15 wherein the communications device includes one or more of a cellular modem, an Ethernet connection, Bluetooth capability and a wireless LAN adapter.

20. The method according to claim 15 wherein the remote application is a mobile application operating on a smart phone, a tablet and/or a desktop computer.

21. The method according to claim 15 wherein the alerts include notification of an anomaly detected in the processed data, notification of a shut-down of the elevator, notification of passenger entrapment in a shut-down elevator, and notification of maintenance required on the elevator.

22. The method according to claim 21 wherein the anomaly in the processed data includes detection, through audio signal processing by the controller, of abnormal ride quality sounds from elevator roller guides, door opening or closing sounds different than a historical norm, and door opening or closing sounds at times not corresponding to a beginning or an ending of an elevator trip.

23. The method according to claim 15 wherein the remote application includes a running on arrival (ROA) watch activation button which causes the communications device and the controller to transmit elevator status data, an elevator historical event log, and an elevator streaming event log to the remote application.

* * * * *